United States Patent [19]

Dreschmann et al.

[11] Patent Number: 4,614,446
[45] Date of Patent: Sep. 30, 1986

[54] FASTENING DEVICE FOR THE ROLLERS OF A ROLLER BUSHING

[75] Inventors: Peter Dreschmann, Dittelbrunn; Wilhelm Walter, Reith; Günter Scharting, Gochsheim; Steffen Neugebauer, Hesselbach, all of Fed. Rep. of Germany

[73] Assignee: FAG Kugelfischer Georg Schafer (KGaA), Fed. Rep. of Germany

[21] Appl. No.: 729,674

[22] Filed: May 2, 1985

[30] Foreign Application Priority Data

May 23, 1984 [DE] Fed. Rep. of Germany ....... 3419111

[51] Int. Cl.$^4$ ............................................. F16C 33/78
[52] U.S. Cl. .................................. 384/484; 384/560; 384/564; 384/903
[58] Field of Search ............... 384/484, 903, 564, 560, 384/485; 308/DIG. 11

[56] References Cited

U.S. PATENT DOCUMENTS

| | | | |
|---|---|---|---|
| 3,409,337 | 11/1968 | Foote | 384/484 |
| 3,447,848 | 6/1969 | Pitner | 384/484 |
| 4,236,767 | 12/1980 | Feldle | 308/DIG. 11 |

Primary Examiner—Lenard A. Footland
Attorney, Agent, or Firm—Ostrolenk, Faber, Gerb & Soffen

[57] ABSTRACT

A fastening device for the rollers of a roller bushing, such as a universal joint bushing. The roller bushing includes a pin, an outer bushing around and spaced from the pin and rollers between the pin and the outer bushing. A groove in the outer bushing receives a holding ring which is generally U shaped. The groove in the outer bushing is shaped for receiving the radially outer leg of the holding ring under tension. The radially inner leg of the holding ring has projections which cooperate with projections on an outer seal for snap-holding the outer seal to close off the space between the pin and the bushing. The radially-directed, axially inwardly facing surface of the transition leg of the holding ring rests against the axially inward surface of the groove. Further, an inner sealing element for the space between the pin and the outer bushing rests against that same surface of the transition leg of the holding ring.

6 Claims, 1 Drawing Figure

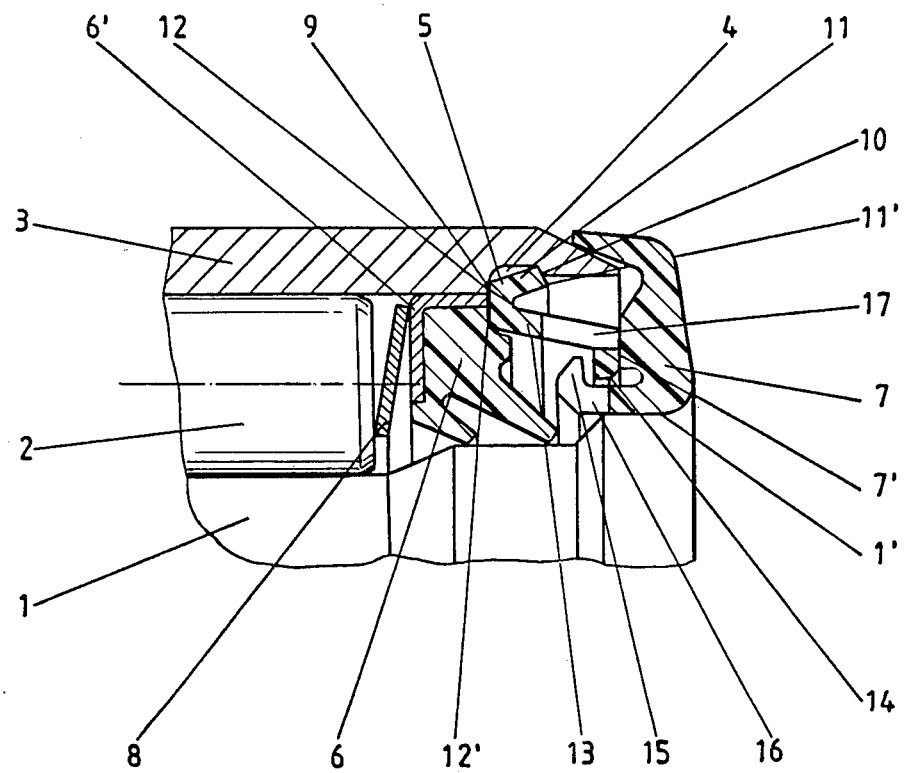

FASTENING DEVICE FOR THE ROLLERS OF A ROLLER BUSHING

BACKGROUND OF THE INVENTION

The present invention relates to a roller bushing, and more particularly to a fastening device for the rollers of the bushing. Such a bushing is used, for example, in a universal joint.

A universal joint bushing or other roller bushing typically includes a central pin, an outer bushing surrounding and spaced from the pin for defining an annular space betwen the pin and the outer bushing, and a complement of roller elements, e.g. cylindrical roller elements, disposed in the annular space and rollable as the outer bushing rotates with respect to the pin. The rollers of the bushing and with them the outer bushing and the pin must be fastened to prevent undesired axial shifting of the rollers. Further, it is desirable for the annular space in which the rollers are disposed to be sealed generally from the environment.

Fastening devices of the above-mentioned type have been used for a long time. For bushings of large wall thickness, the axial fastening is generally produced by the spring action of retainer rings or by the snapping of side disks into a groove produced by machining. This results in considerable expense for manufacture, because additional elements are generally necessary to receive an outer seal. For bushings produced by non-cutting processes, the axial fastening is effected predominantly by plastic deformation of the bushing at the open end. Insofar as an inner seal and/or spring elements for the axial clamping of the rollers are present, the fastening is possible only after the insertion of these elements. This is disadvantageous from a manufacturing standpoint. In addition, there is often poor precision in manufacture, which makes precise axial guidance of the rollers or the application of a precise initial tension difficult.

SUMMARY OF THE INVENTION & BRIEF DESCRIPTION OF THE DRAWING

The object of the present invention is to improve a fastening device of the above-mentioned type to obtain precise axial guidance with well-defined axial clearance or an initial axial tension of the rollers, which can be maintained within narrow limits. Further, the expense of manufacture should be kept as low as possible. In particular, deformation of the edge of the bushing, caused by the manufacturing technique, after the insertion of sealing or resilient elements, should be avoided, and the possibility of applying an integrated outer seal should be present.

The present invention is concerned with a roller bushing having a pin, an outer bushing around the pin and spaced therefrom for defining an annular space, and a complement of rolling elements, here cylindrical rollers, disposed in the annular space to permit relative rotation of the outer bushing with respect to the pin. It is desirable to prevent axial shifting of the rollers in the annular space. For this purpose, axially outwardly of the ends of the rollers, the outer bushing has a radially inwardly facing groove formed in it. That groove has an axially inward side (that faces outward) and an axially outward side (that faces inward). The axially inward side of the groove is precisely positioned and radially-directed, and it defines the position of the below-described holding ring. The axially outward side of that groove is obliquely inclined, and it extends axially further outwardly moving out of the groove in the radially inward direction.

A holding ring is provided which, in its entirety, is generally U-shaped in cross-section. The U lies on its side. The U-shaped holding ring includes a radially outward leg which is received within the groove in the outer bushing. The axially outward end of that leg meets the obliquely inclined outward side of the groove. The axially inward end of that outward leg merges into a radially extending transition leg of the holding ring. The axially inward side of the transition leg is radially-directed, and that radially-directed side of the transition leg rests against the radially-directed axially inward side of the groove. The length of the radially outward leg is selected so that when the radially outward leg is disposed in the groove, it is under slight tension.

The transition leg meets a radially inward leg of the holding ring. That radially inward leg also extends axially outwardly and is slightly obliquely inclined radially inwardly in the axially outward direction. The inward leg includes first holding means at its axially outward end for holding an outer seal for the annular space. The outer seal between the pin and the outer bushing seals the annular space. The outer seal includes cooperating second holding means for engaging with the first holding means on the leg of the holding ring, thereby holding the outer seal to the holding ring and covering the annular space.

At the axially inward side of the holding ring and between the holding ring and the axially outward end of the rollers, an inner seal is disposed which also seals the annular space. There may additionally be a spring element between the holding ring, on the one hand, and the outer end of the rollers, on the other hand, and that spring may be between the inner seal and the outer end of the rollers. The spring normally biases the end of the rollers away from the inner seal or from the inner seal together with the holding ring.

The groove in the outer bushing can be produced in known manner by machining or by a non-cutting method. The axially inward, substantially radially-directed side of the groove should be precisely positioned, while the obliquely outward inclined axially outward side has greater tolerances resulting from manufacture. In addition, there are the tolerances of the holding ring, which is preferably developed as a plastic part. In order substantially to compensate for the tolerances occurring here, the above-described holding ring is used. Depending on the tolerances, the radially outward slightly conically outwardly directed leg of the holding ring will spring to a greater or lesser extent into the groove. In all cases, precise axial positioning of the holding ring is obtained. The form-locked and force-locked connection furthermore prevents unintended emergence or exiting of the holding ring and of the parts resting against it, which parts may also be under initial spring tension.

Without additional expense, an inner seal and/or, possibly, a spring element, may be interposed between the holding ring and the roller end surfaces. It is merely necessary that the seal and/or spring element come to rest against the extended, radially-directed surface of the transition leg of the holding ring.

In order to be able to also fasten an outer seal to the roller bushing for sealing the annular space, the holding ring has a radially inward leg, which is directed generally axially and obliquely inwardly and which extends from the radially-directed transition leg of the holding ring. This gives the combination of the radially outward, radially-directed transition and radially inward legs a generally "V" or "U" shape. Adjoining the radially inward leg of the holding ring, there is an inner end section having holding projections for holding sections of the outer seal.

In order to facilitate the mounting of the holding ring and possibly also of the outer seal, one or both of these two parts can be provided with slits at their sections at which deformation must take place upon the snapping in. The mounting of the outer seal, which may be present, is further facilitated by the fact that the axially extending radially inward leg of the holding ring is directed obliquely inward and that it acts, as close as possible to the pin outer diameter, on the corresponding resting surface of the outer seal.

Other objects and features of the invention will be explained with reference to the accompanying drawing, which shows a partial cross-section through a universal joint bushing according to the invention.

DESCRIPTION OF A PREFERRED EMBODIMENT

A universal joint bushing is shown in the drawing. It includes a central pin, a sleeve-like outer bushing around the pin and defining an annular space around the pin, and a complement of parallel, cylindrical rollers 2 in the annular space which are in rolling contact with the outer bushing 3 and which are arranged on and are in rolling contact with the pin 1. Only one of the rollers can be seen. The free axial end of the pin can be seen.

The outer bushing 3 has an inner surface groove 4 defined toward its sealable outer end, beyond the end of the pin. A holding ring 5 is arranged in the groove 4. That ring is comprised of stiff, resilient plastic. At its axially inward side (left side in the drawing), the ring 5 holds and fastens the annular inner seal 6 for the rollers. The inner seal 6 does not lie directly against the ends of the rollers 2. Instead, a cup spring 8 is interposed between them and the spring is biased outwardly against both the rollers and the seal. At its axially outward side (right side), the ring 5 holds the outer seal 7, which is located at the open end of the bushing 3.

The groove 4 has an axially inward end side 9 which has a precisely positioned, radially-directed, axially outwardly facing surface. The groove has an axially outward end side 10, which has a generally axially inwardly facing, inclined surface that tapers wider moving radially inwardly, i.e. out of the groove 4. The holding ring 5 is approximately U-shaped in the region of the fastening point in it cross-section, with the U lying on its side. The radially outer leg 11 of the ring 5 is directed substantially axially, but is inclined slightly radially obliquely outwardly in the direction toward the outside of the bushing. The radially inner leg 13 of the ring 5 is directed substantially axially, but is inclined slightly radially obliquely inwardly, in the direction toward the outside of the bushing. The transition leg 12 between the two legs 11 and 13 is a short, radially-directed leg which together with the legs 11 and 13 gives the holding ring its generally U shape. The leg 12 has a precisely radially directed axially inwardly facing resting surface 12' on its inward facing side 12'. That side of the holding ring 5 lies against the precisely positioned radial surface of the inward end side 9 of the groove 4. The oblique free end side 11' of the leg 11, on the other hand, comes to rest with initial tension against the obliquely outwardly inclined surface of the outward end side 10 of the groove 4. In this way, the holding ring 5 is simply mounted, yet with precise fixing of its position.

These advantages are also present when a resilient material inner seal 6 and a spring element 8 are also provided between the ends of the rollers 2 and the holding ring 5. An L cross-section, rigid, angle ring 6' forms part of the seal and lies against the axially inward side of the radially-directed leg 12 of the holding ring 5, just outside the groove 4.

The holding ring inner leg 13 is elongate, and its outer end comes to rest in the vicinity of the outer pin shoulder 1', against the resting surface 7' of the outer seal 7. This facilitates pushing of the seal 7 onto the pin shoulder 1' during mounting of the outer seal. The leg 13 is provided on its radially inner side at its axially outer end with holding projections 14 for locking to the holding sections 15 of the outer seal 7. In order to facilitate its snapping into position, the outer seal 7 is provided with slits 16 in the region of the holding sections 15, and the slits permit the needed deformation of the section 15. The open regions 17 in leg 13 permit communication between the inside of the bushing and the environment. In this way, pressure equalization can take place upon the mounting and upon relubrication.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:
1. An axial fastening device for the rollers of a roller bushing, wherein the roller bushing comprises an inner pin, an outer bushing around and spaced from the pin defining an annular space between them and rolling elements disposed between the pin and the outer bushing in the annular space, the pin having a free, axially outward end; the outer bushing having its outward end, the rollers having respective outward ends; the pin and outer bushing outward ends extending axially outward beyond the roller outward ends;

the fastening device comprising:
the outer bushing having a radially inwardly facing groove formed in it toward the outward end of the outer bushing and beyond the outward ends of the rollers inside the outer bushing; the groove having an axially inward side that is axially closer to the ends of the rollers and having an axially outward side that is axially outward of the inward side of the groove;
the axially inward side of the groove comprises a radially directed surface; the axially outward side of the groove comprises an obliquely inclined surface which is inclined axially outwardly radially inwardly of the outer bushing;
a holding ring, generally of U shape in longitudinal cross-section; the ring including a radially more outward leg which is directed substantially axially and which is inclined slightly obliquely radially outwardly in the axially outward direction from the roller; the ring including a radially more inward leg also extending axially outwardly in the direction away from the roller; the ring further including a transition leg for joining its radially inward and radially outward legs, giving the holding ring a generally U shape;

the transition leg having a radially-directed side which faces axially inwardly toward the end of the rollers; the radially inwardly-directed side of the transition leg resting against the axially inward side of the groove in the outer bushing; the radially outward leg of the holding ring terminating in an axially outward end side which is disposed in the groove and rests against the obliquely inclined outward side of the groove, and the outward leg of the holding ring being of such a length that with the transition leg surface resting on the inward groove surface and the end side of the radially outer leg resting against the outward surface of the groove, the outward leg of the holding ring is under initial tension, and an inner seal for the bushing disposed between the outward end of the rollers and the transition leg of the holding ring and being sized for sealing the annular space between the pin and the outer bushing.

2. The fastening device of claim 1, wherein the inner seal rests against the axially inward side of the transition leg of the holding ring.

3. The fastening device of claim 1, further comprising a spring element disposed between the end of the rollers and the inner seal and normally biasing the rollers and the inner seal apart.

4. The fastening device of claim 1, wherein the radially inward leg of the holding ring includes thereon first holding means for holding an outer seal to the bushing; an outer seal disposed over the outward end of the bushing and shaped for closing off the annular space between the pin and the outer bushing and including second holding means for cooperating with the first holding means of the holding ring radially inward leg for holding the outer seal to the bushing.

5. The fastening device of claim 4, wherein the first holding means of the radially inner leg of the holding ring comprises radially inwardly directed projections and the second holding means on the outer seal comprise radially outwardly directed projections which lock to the radially inwardly directed projections, and the second holding means on the outer seal being deflectable for and enabling snap-fitting of the outer seal second holding means to the holding ring first holding means projections.

6. The fastening device of claim 5, further comprising openings defined in the radially inward leg of the holding ring and in the outer seal for providing communication of the annular space between the pin and the outer bushing with the environment.

* * * * *